United States Patent
Defosse

(10) Patent No.: US 10,001,188 B2
(45) Date of Patent: Jun. 19, 2018

(54) ELECTROMECHANICAL ACTUATOR COMPRISING A DUAL-FUNCTION BRAKING DEVICE

(71) Applicant: SAFRAN ELECTRONICS & DEFENSE, Boulogne Billancourt (FR)

(72) Inventor: Xavier Defosse, Boulogne Billancourt (FR)

(73) Assignee: SAFRAN ELECTRONICS & DEFENSE, Boulogne Billancourt (FR)

( * ) Notice: Subject to any disclaimer, the term of this patent is extended or adjusted under 35 U.S.C. 154(b) by 0 days. days.

(21) Appl. No.: 15/323,863

(22) PCT Filed: Jun. 10, 2015

(86) PCT No.: PCT/EP2015/062923
§ 371 (c)(1),
(2) Date: Jan. 4, 2017

(87) PCT Pub. No.: WO2016/005135
PCT Pub. Date: Jan. 14, 2016

(65) Prior Publication Data
US 2017/0146085 A1     May 25, 2017

(30) Foreign Application Priority Data

Jul. 8, 2014 (FR) ..................... 14 56587

(51) Int. Cl.
| | | |
|---|---|---|
| *F16D 67/02* | (2006.01) | |
| *F16D 55/38* | (2006.01) | |
| *F16D 65/18* | (2006.01) | |
| *F16D 41/02* | (2006.01) | |
| *F16D 121/18* | (2012.01) | |
| *F16D 121/16* | (2012.01) | |

(52) U.S. Cl.
CPC ............ *F16D 67/02* (2013.01); *F16D 41/02* (2013.01); *F16D 55/38* (2013.01); *F16D 65/186* (2013.01); *F16D 2121/16* (2013.01); *F16D 2121/18* (2013.01)

(58) Field of Classification Search
None
See application file for complete search history.

(56) References Cited

U.S. PATENT DOCUMENTS

2002/0025880 A1   2/2002   Kusumoto et al.

FOREIGN PATENT DOCUMENTS

JP         02-19619 A      1/1990

*Primary Examiner* — Jacob S. Scott
(74) *Attorney, Agent, or Firm* — Muncy, Geissler, Olds & Lowe, P.C.

(57) ABSTRACT

An electromechanical actuator comprising a body and an electric motor driving at least one motion transmission element connected to the body via a brake device, and a unidirectional transmission member, the brake device including an electrical activator member so that when the activator member is powered, the unidirectional transmission member is released relative to the body, and when the activator member is not powered, the unidirectional transmission member is secured to the body and opposes pivoting of the transmission element in one direction of rotation up to a maximum transmissible torque defined by the torque limiter.

4 Claims, 1 Drawing Sheet

ELECTROMECHANICAL ACTUATOR COMPRISING A DUAL-FUNCTION BRAKING DEVICE

BACKGROUND OF THE INVENTION

Field of the Invention

The present invention relates to moving a movable element relative to a fixed body, and more precisely it relates to an electromechanical actuator suitable for use by way of example in aviation, and in particular for moving a flight control surface relative to the structure of an aircraft. By way of example, such a flight control surface may be an aileron, an elevon, a flap, a rudder control surface, an elevator, a spoiler, or any other flight control surface.

Aircraft generally comprise a fixed structure, such as a wing or a tail having flight control surfaces hinged thereto that are mounted on the fixed structure so as to pivot. Actuators connect the movable surfaces mechanically to the fixed structure and are themselves connected so as to be controlled by a control unit on which the pilot of the aircraft acts.

Description of Related Art

Actuators are known that comprise an electric motor and a motion transmission element driven by a rotor of the electric motor. Generally, in such actuators, the electric motor has a stator secured to a body that is fastened to the fixed structure, and a transmission element drives an inlet element of a transmission system such as a screw-and-nut assembly and/or stepdown gearing, with an outlet element fastened to the flight control surface so that a movement of the outlet element causes the flight control surface to pivot between a deployed position and a retracted position or a neutral position.

In the event of a failure of the motor or of its control means, depending on the type of flight control surface, it may be preferable to leave the flight control surface free to move towards one of its positions while preventing the flight control surface from moving towards the second of its positions, e.g. under the effect of aerodynamic forces. For this purpose, the transmission assembly generally includes an overrunning clutch or "freewheel" that can become clutched in the event of motor failure in order to oppose pivoting of the transmission element in the direction corresponding to the flight control surface moving towards its second position.

When the freewheel is clutched, the flight control surface tending to move towards its deployed position exerts a torque on the transmission element, which torque is transmitted to the body. Under certain circumstances, the torque can be large and risks damaging the entire transmission system all the way to the structure of the aircraft.

BRIEF SUMMARY OF THE INVENTION

An object of the invention is to remedy that drawback.

To this end, the invention provides an electromechanical actuator comprising a body, an electric motor having a stator fastened to the body, and at least one motion transmission element rotatably connected to a rotor of the motor, said element being connected to the fixed body via a unidirectional transmission member and a brake device, the brake device comprising at least one inner ring connected to rotate with a first portion of the unidirectional transmission member and at least one outer ring connected to rotate with the body. According to the invention, the unidirectional transmission member is mounted directly between the transmission element and the brake device and the brake device comprises an electrical activator member in such a manner that, when the activator member is powered, the unidirectional transmission member is released relative to the body and when the activator member is not powered, the unidirectional transmission member is secured to the body and opposes pivoting of the transmission element in one direction of rotation up to a maximum transmissible torque that is defined by sliding between the inner ring and the outer ring and that is predetermined in order to avoid excessive force on the transmission element damaging the actuator or a support on which the actuator is fastened.

Thus, in the event of excessive torque, the brake device allows the transmission element to slide relative to the body, thereby limiting any risk of damaging the body. The brake device therefore advantageously has a dual function of brake member and torque limiter. The actuator of the invention thus has a structure that is particularly compact. Furthermore, the actuator of the invention avoids the need for an additional dedicated torque limiter.

Preferably, the actuator comprises a casing in which the brake device and the unidirectional transmission member are housed.

This embodiment makes it possible to incorporate the brake device and the unidirectional transmission member in a single subassembly, and that makes the actuator particularly compact.

Other characteristics and advantages of the invention appear on reading the following description of a particular, non-limiting embodiment of the invention.

BRIEF DESCRIPTION OF THE DRAWINGS

Reference is made to the accompanying drawing, in which.

DETAILED DESCRIPTION OF THE INVENTION

Figure 1:
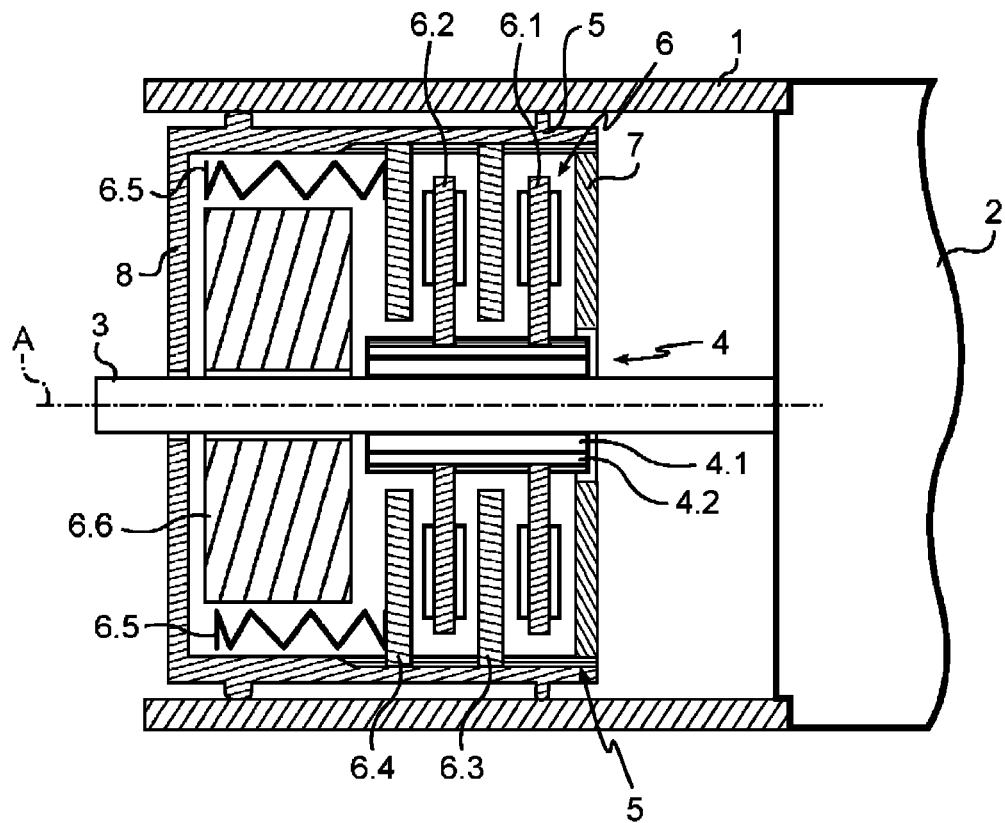
FIG. 1 is a diagrammatic longitudinal section view of an actuator of the invention.
Figure 2:
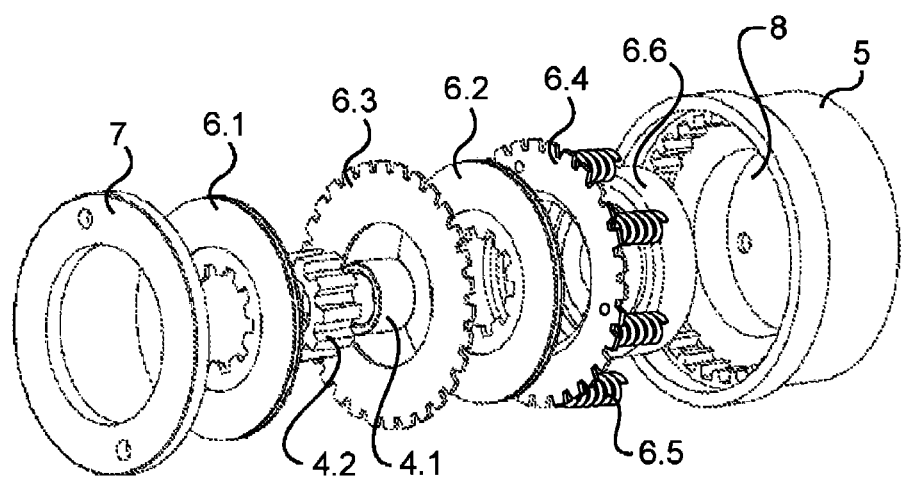
FIG. 2 is an exploded view of the brake device and the unidirectional transmission member of the actuator shown in FIG. 1.

The actuator of the invention is described herein in an application to moving a flight control surface relative to the structure of an aircraft. The flight control surface is movable between a deployed position and a neutral or retracted position.

With reference to the figures, the electromechanical actuator comprises a body 1 and an electric motor 2 having a stator fastened to the body 1 and a rotor rotatably connected to a motion transmission element.

The body 1 has conventional means for fastening it to the structure of an aircraft.

The electric motor 2 is powered by a control unit (not shown) that is connected to the electricity network of the aircraft for its own power supply and for powering the actuator, and that is connected to the cockpit of the aircraft to receive orders therefrom for deploying or retracting the flight control surface.

In this example, the motion transmission element is a shaft 3 pivotally mounted in the body 1 and connected to the flight control surface via a motion transmission assembly (not shown). By way of example, the motion transmission assembly comprises a stepdown device and/or a motion transformation device such as a screw-and-nut assembly, and has an inlet element rotatably connected to the shaft 3 and an outlet element e.g. connected to the free end of a lever that is connected to the flight control surface. The shaft 3 is guided in rotation relative to the body 1 by bearings (not shown) and it is connected to the body 1 via a unidirectional transmission member, specifically in this example a freewheel given overall reference 4, and a brake device given overall reference 6, which in this example are both received in a casing 5. The casing 5 is rigidly fastened to the body 1. The casing 5 is generally of cylindrical shape centered on the axis of rotation A of the shaft 3.

The freewheel 4 comprises an inner portion 4.1 secured to the shaft 3, an outer portion 4.2 pivotally mounted on the inner portion 4.1, and a ratchet assembly allowing the outer portion 4.2 to turn in only one direction of rotation. In this example, the outer portion 4.2 is connected to rotate with a first inner ring 6.1 of the brake device 6 and a second inner ring 6.2 of the brake device.

In addition to the two inner rings 6.1 and 6.2, the brake device 6 comprises a first outer ring 6.3 and a second outer ring 6.4. The two outer rings 6.3 and 6.4 are fastened to the casing 5 with axial clearance. The two outer rings 6.3 and 6.4 are more precisely engaged in a fluted portion of the inside wall of the casing 5. The second inner ring 6.2 is fastened with axial clearance to the outer portion 4.2 (the second inner ring 6.2 is more precisely engaged in the fluting of the outside surface of the outer portion 4.2) and has a portion with faces that are each provided with a friction lining and that extend between friction linings carried by the two outer rings 6.3, 6.4. The first inner ring 6.1 is fastened with axial clearance to the outer portion 4.2 (the first inner ring 6.1 is more precisely engaged in fluting of the outside surface of the outer portion 4.2) and has a portion with faces that are each provided with a friction lining and that extend between friction linings carried by the first outer ring 6.3 and by a lid 7 of the casing 5. Springs 6.5 extend between a bottom 8 of the casing 5 (bottom 8 opposite the lid 7 of said casing) and the second outer ring 6.4 in order to clamp the inner rings 6.2 and 6.1 respectively between the outer rings 6.3 and 6.4 and between the first outer ring 6.3 and the lid 7. The brake device 6 also has an electrical activator member 6.6 in the form of a solenoid dimensioned so that when it is powered it attracts the second outer ring 6.4 and moves it away from the inner rings 6.1 and 6.2 and from the first outer ring 6.3 against the force exerted by the springs 6.5.

The casing 5 thus comprises in succession from its lid 7 to its bottom 8 along the axis A: the first inner ring 6.1, the first outer ring 6.3, the second inner ring 6.2, the second outer ring 6.4 and the electrical activator member 6.6. From the lid 7 to the bottom 8 along the axis A, the first inner ring 6.1, the first outer ring 6.3, the second inner ring 6.2, and the second outer ring 6.4 extend in succession about the outer portion 4.2.

The two inner rings 6.1 and 6.2, the two outer rings 6.3 and 6.4, the electrical activator member 6.6 and the freewheel 4 are in this example all centered on the axis of rotation A of the shaft 3.

The casing makes it possible to incorporate the brake device and the unidirectional transmission member in a single subassembly. Furthermore, the casing is particularly compact and easy to arrange.

Sliding between the inner rings 6.1 and 6.2 and the outer rings 6.3 and 6.4, made possible by the springs 6.5 that make it possible for the inner and outer rings as well as the lid 7 to be clamped together, defines a maximum transmissible torque from the inner rings 6.1 and 6.2 to the outer rings 6.3 and 6.4. The springs 6.5 thus participate in this example in defining sliding, and thus of the maximum transmissible torque, since they make it possible to transmit torque between the inner rings 6.1 and 6.2 and the outer rings 6.3 and 6.4.

The brake device is configured in such a manner that sliding defines maximum transmissible torque that is predetermined in order to avoid excessive torque on the transmission element damaging the actuator or a support on which the actuator is fastened.

The brake device 6 thus makes it possible to play the role of both torque limiter and brake. The maximum transmissible torque is defined by the brake device itself.

In operation, when the activator member 6.6 is powered, the shaft 3 can pivot in both directions of rotation (it should be observed that in the direction passed by the freewheel 4, the motor 2 delivers little or no drive to the inner rings 6.1 and 6.2) and, when the activator member 6.6 is not powered, the freewheel 4 opposes rotation of the shaft 3 in one of the two directions of rotation. Thus, when the activator member 6.6 is powered, the electric motor 2, which is also powered, drives the shaft 3 to turn in either of its directions of rotation.

When the activator member 6.6 is not powered, the electric motor 2 is likewise not powered so that only aerodynamic forces acting on the flight control surface can cause the shaft 3 to pivot. Because of the freewheel opposing turning of the shaft 3 in one of the two directions of rotation, the shaft 3 prevents the flight control surface from moving away from its neutral position towards its deployed position, whereas the flight control surface is left free to move towards its neutral position. Nevertheless, if the aerodynamic forces acting on the flight control surface exert a torque on the shaft 3 that is greater than the maximum torque that can be transmitted between the outer and inner rings of the brake device 6, the inner rings will pivot relative to the outer rings, thus allowing the shaft 3 to turn and allowing the flight control surface to move towards its deployed position. As a result, the brake device 6 limits the torque that can be transmitted to the structure of the aircraft and to the body 1 via the shaft 3 and the freewheel 4 when the activator member is not powered.

Naturally, the invention is not limited to the embodiments described but encompasses any variant coming within the ambit of the invention as defined by the claims.

In particular, the brake device may have any number of different inner and outer rings.

The actuator may have no casing in which the brake device and the unidirectional transmission member are housed.

The one-way transmission member may make use of pawls, rollers, or of chocking elements.

The invention claimed is:

1. An electromechanical actuator comprising a fixed body, an electric motor having a stator fastened to the fixed body, and at least one motion transmission element rotatably connected to a rotor of the motor, said element being connected to the fixed body via a unidirectional transmission member and a brake device, the brake device comprising at least one inner ring connected to rotate with a first portion of the unidirectional transmission member and at least one outer ring connected to the fixed body with axial clearance, the actuator being characterized in that the unidirectional transmission member is mounted directly between the transmission element and the brake device and in that the brake device comprises an electrical activator member configured so that, when the activator member is powered, the unidirectional transmission member is released relative to the fixed body and that when the activator member is not powered, the unidirectional transmission member is secured to the fixed body and opposes pivoting of the transmission element in one direction of rotation up to a maximum transmissible torque that is defined by sliding between the inner ring and the outer ring and that is predetermined in order to avoid excessive force on the transmission element damaging the actuator or a support on which the actuator is fastened.

2. The actuator according to claim 1, wherein the brake device comprises two inner rings and two outer rings, the inner and outer rings being in alternation.

3. The actuator according to claim 1, wherein the unidirectional transmission member is a freewheel.

4. The actuator according to claim 1, comprising a casing in which the brake device and the unidirectional transmission member are housed.

* * * * *